United States Patent
Jeong et al.

(10) Patent No.: US 7,590,187 B2
(45) Date of Patent: Sep. 15, 2009

(54) DIGITAL BROADCASTING TRANSMISSION AND/OR RECEPTION SYSTEM TO IMPROVE RECEIVING PERFORMANCE AND SIGNAL PROCESSING METHOD THEREOF

(75) Inventors: Hae-jo Jeong, Seoul (KR); Yong-deok Chang, Suwon-si (KR); Eui-jun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/175,884

(22) Filed: Jul. 18, 2008

(65) Prior Publication Data

US 2008/0273121 A1 Nov. 6, 2008

Related U.S. Application Data

(63) Continuation of application No. 11/121,064, filed on May 4, 2005.

(60) Provisional application No. 60/568,275, filed on May 6, 2004.

(30) Foreign Application Priority Data

Dec. 6, 2004 (KR) .............................. 2004-101931

(51) Int. Cl.
*H04L 5/12* (2006.01)
(52) U.S. Cl. ..................................................... 375/265
(58) Field of Classification Search ................. 375/265, 375/259, 260, 261
See application file for complete search history.

(56) References Cited

U.S. PATENT DOCUMENTS 1,449,382 A 3/1923 Carson (Continued)

FOREIGN PATENT DOCUMENTS

EP 0 533 363 3/1993

(Continued)

OTHER PUBLICATIONS

Gaddam, Vasanth R., et al., "A Newly Proposed ATSC DTV System for Transmitting a Robust Bit-stream along with the Standard Bit-stream", IEEE, 2003, pp. 933-938.

(Continued)

*Primary Examiner*—Kevin M Burd
(74) *Attorney, Agent, or Firm*—Stein McEwen, LLP

(57) ABSTRACT

A digital broadcasting transmission and/or reception system having an improved reception performance and a signal-processing method thereof. A digital broadcasting transmitter comprises a randomizer to input and randomize data streams including a plurality of segments having at least one segment having one or more null packets, a null packet exchanger to create known data having a predetermined pattern and to replace the null packets at positions of the segments having the null packets of the randomized data streams to insert the known 'data, an encoder to encode the data streams to which the known data is inserted, and a modulation/RF unit to modulate, RF-modulate, and transmit the encoded data streams. A digital broadcasting receiver detects the known data' from a signal received from the digital broadcasting transmitter and uses the detected known data for synchronization and equalization, so that a digital broadcasting reception performance of the digital broadcasting receiver can be improved at poor multipath channels.

20 Claims, 6 Drawing Sheets

U.S. PATENT DOCUMENTS

| | | | |
|---|---|---|---|
| 3,701,023 | A | 10/1972 | Fang |
| 4,048,572 | A | 9/1977 | Dogliotti et al. |
| 4,058,713 | A | 11/1977 | DiToro |
| 4,365,338 | A | 12/1982 | McRae et al. |
| 4,447,908 | A | 5/1984 | Chevillat et al. |
| 5,023,889 | A | 6/1991 | Divsalar et al. |
| 5,105,443 | A | 4/1992 | Betts et al. |
| 5,111,155 | A | 5/1992 | Keate et al. |
| 5,127,051 | A | 6/1992 | Chan et al. |
| 5,233,349 | A * | 8/1993 | Moulsley ............... 341/107 |
| 5,260,972 | A | 11/1993 | Wang |
| 5,263,051 | A | 11/1993 | Eyuboglu |
| 5,267,269 | A | 11/1993 | Shih et al. |
| 5,394,440 | A | 2/1995 | Goldstein et al. |
| 5,477,199 | A | 12/1995 | Montreuil |
| 5,541,964 | A | 7/1996 | Cohen et al. |
| 5,602,602 | A | 2/1997 | Hulyalkar |
| 5,604,724 | A | 2/1997 | Shiokawa |
| 5,625,642 | A | 4/1997 | Wornell |
| 5,648,923 | A | 7/1997 | Lane et al. |
| 5,706,057 | A | 1/1998 | Strolle et al. |
| 5,715,242 | A | 2/1998 | Ortel et al. |
| 5,805,242 | A | 9/1998 | Strolle et al. |
| 5,835,532 | A | 11/1998 | Strolle et al. |
| 5,841,484 | A | 11/1998 | Hulyalkar et al. |
| 5,894,334 | A | 4/1999 | Strolle et al. |
| 6,044,111 | A | 3/2000 | Meyers et al. |
| 6,256,494 | B1 | 7/2001 | Lopes et al. |
| 6,292,518 | B1 | 9/2001 | Grabb et al. |
| 6,366,621 | B1 | 4/2002 | Kuntz et al. |
| 6,374,386 | B1 | 5/2002 | Kim et al. |
| 6,397,367 | B1 | 5/2002 | Park et al. |
| 6,445,750 | B1 | 9/2002 | Chen et al. |
| 6,459,741 | B1 | 10/2002 | Grabb et al. |
| 6,447,208 | B1 | 11/2002 | Huff |
| 6,539,062 | B1 | 3/2003 | Grabb et al. |
| 6,608,870 | B1 * | 8/2003 | Fimoff ............... 375/270 |
| 6,687,310 | B1 | 2/2004 | Fimoff et al. |
| 6,693,958 | B1 | 2/2004 | Wang et al. |
| 6,731,711 | B1 | 5/2004 | Jun |
| 6,760,077 | B2 | 7/2004 | Choi et al. |
| 6,760,374 | B1 | 7/2004 | Tapp et al. |
| 6,763,064 | B1 | 7/2004 | Graf et al. |
| 6,810,084 | B1 | 10/2004 | Jun et al. |
| 6,912,258 | B2 | 7/2005 | Birru |
| 6,922,215 | B2 | 7/2005 | Choi et al. |
| 6,924,847 | B2 | 8/2005 | Choi et al. |
| 6,956,619 | B2 | 10/2005 | Choi et al. |
| 6,967,690 | B2 | 11/2005 | Choi et al. |
| 6,973,137 | B2 | 12/2005 | Birru et al. |
| 6,985,093 | B2 | 1/2006 | Jaffe et al. |
| 7,027,103 | B2 | 4/2006 | Choi et al. |
| 7,030,935 | B2 | 4/2006 | Choi et al. |
| 7,031,382 | B2 | 4/2006 | Hessel et al. |
| 7,068,326 | B2 | 6/2006 | Choi et al. |
| 7,167,212 | B2 | 1/2007 | Choi et al. |
| 7,256,839 | B2 | 8/2007 | Choi et al. |
| 7,259,797 | B2 | 8/2007 | Choi et al. |
| 7,317,491 | B2 | 1/2008 | Choi et al. |
| 7,327,403 | B2 | 2/2008 | Choi et al. |
| 2001/0005234 | A1 | 6/2001 | Choi et al. |
| 2001/0034867 | A1 | 10/2001 | Jaffe et al. |
| 2002/0181581 | A1 | 12/2002 | Birru et al. |
| 2002/0181599 | A1 | 12/2002 | Choi et al. |
| 2003/0021341 | A1 | 1/2003 | Vigil et al. |
| 2003/0048839 | A1 | 3/2003 | Beale et al. |
| 2003/0099303 | A1 | 5/2003 | Birru et al. |
| 2003/0099309 | A1 | 5/2003 | Fimoff et al. |
| 2003/0103575 | A1 | 6/2003 | Birru et al. |
| 2003/0026088 | A1 | 12/2003 | Cameron et al. |
| 2003/0226088 | A1 | 12/2003 | Cameron et al. |
| 2005/0162886 | A1 * | 7/2005 | Jeong et al. ............... 365/63 |
| 2005/0163196 | A1 | 7/2005 | Currivan |
| 2006/0269012 | A1 * | 11/2006 | Kim et al. ............... 375/270 |
| 2007/0076584 | A1 | 4/2007 | Kim et al. |
| 2007/0092030 | A1 | 4/2007 | Yu et al. |
| 2007/0092034 | A1 | 4/2007 | Yu et al. |
| 2007/0140257 | A1 | 6/2007 | Lee et al. |
| 2007/0153933 | A1 | 7/2007 | Lee et al. |
| 2008/0049842 | A1 | 2/2008 | Choi et al. |
| 2008/0075201 | A1 | 3/2008 | Limberg |

FOREIGN PATENT DOCUMENTS

| | | |
|---|---|---|
| EP | 0 913 950 | 5/1999 |
| JP | 11-239179 | 8/1999 |
| KR | 2001-111667 | 12/2001 |
| KR | 2002-5455 | 7/2002 |
| KR | 2002-62076 | 7/2002 |
| KR | 2002-89078 | 11/2002 |
| KR | 2003-41109 | 5/2003 |
| KR | 2006-18848 | 3/2006 |
| WO | WO 99/32779 | 5/1999 |
| WO | WO 01/63868 | 8/2001 |
| WO | WO 02/093754 | 11/2002 |
| WO | WO 03/017499 | 2/2003 |

OTHER PUBLICATIONS

Kim, Hyoung-Nam, et al., "Performance Analysis of Error Propagation Effects in the DFE for ATSC DTV Receivers", *IEEE Transactions on Broadcasting*, V. 49, No. 3, Sep. 2003, pp, 249-257.

Hongwei, Liu, et al., "Blind Equalization Algorithm Based on Cyclostationary Property of IF Signal", *Proceedings of ICSP*, 1998, pp. 498-501.

Liu, Hong, "Frequency-Domain Equalization of Single Carrier Transmissions Over Doubly Selective Channels", Dissertation, Graduate School of The Ohio State University, 2007.

Ungerboeck, Gottfried, "Trellis-Coded Modulation with Redundant Signal Sets—Part I: Introduction", *IEEE Communications Magazine*, V. 25, No. 2, Feb. 1987, p. 5-11.

Ungerboeck, Gottfried, "Channel Coding with Multilevel/Phase Signals", *IEEE Transactions on Information Theory*, V. IT-28, No. 1, Jan. 1982, pp. 55-67.

Godard, Dominique N., "Self-Recovering Equalization and Carrier Tracking in Two-Dimensional Data Communication Systems", *IEEE Transactions on Communications*, V. Com-28, No. 11, Nov. 1980, pp. 1867-1875.

Ghosh, Monisha, "Blind Decision Feedback Equalization for Terrestrial Television Receivers", *Proceedings of the IEEE*, V. 86, No. 10, Oct. 1998, pp. 2070-2081.

Lee, Gen-kwo, et al., "Bayesian Decision Feedback Techniques for Deconvolution", *IEEE Journal on Selected Areas in Communications:*, V. 13, No. 1, Jan. 1995, pp. 155-166.

Farasakh, Christof, et al., "Data Detection and Channel Allocation on the Uplink of an SDMA Mobile Radio System", *IEEE*, 1997, pp. 2168-2172.

Cherubini, G. et al., "Adaptive Analog Equalization and Receiver Front-End Control for Multilevel Partial-Response Transmission Over Metallic Cables", *IEEE Transactions on Communications*, V. 44, No. 6, Jun. 1996, pp. 675-685.

Lim, Chae-Hyun, et al. "Channel Selective Diversity for DTV Mobile Reception with Adaptive Beamforming", *IEEE*, 2005, pp. 357-364.

Bugallo, Mónica F., et al., "Decision-Feedback Semiblind Channel Equalization in Space-Time Coded Systems", *IEEE*, 2002, pp. 2425-2428.

Bucher, Mary Louise, "Simulation of Multipath Fading/Ghosting for Analog and Digital Television Transmission in Broadcast Channels", *IEEE Transactions on Broadcasting*, V. 38, No. 4, Dec. 1992, pp. 256-262.

Office Action issued by Korean Intellectual Property Office in Korean Patent Application No. 2004-86516 on Sep. 11, 2006.

Trial Decision of Korean Intellectual Property Tribunal, Trial No. 2006won9036, for Korean Patent Application No. 2004-86516, Aug. 30, 2007.

Office Action issued by Russian Patent Office in Russian Patent Application No. 2006124608 on Oct. 19, 2007.

Search Report and Written Opinion issued on May 21, 2005 for International Patent Application No. PCT/KR2005/000179.

ATSC Standard: Digital Television Standard (A/53).

Office Action issued in Korean Patent Application No. 2004-101931 on May 19, 2006.

Search Report and Written Opinion issued on Aug. 24, 2005 for International Patent Application No. PCT/KR/001313.

Office Action issued on Apr. 20, 2006 in Korean Patent Application No. 23004-86516.

Vandenameele, Patrick, et al., "Blind vs. Trained Channel Estimation for an SDMA WLAN", *IEEE*, 1998, pp. 465-470.

Pietrobon, Steven S., et al., "Rotationally Invariant Nonlinear Trellis Codes for Two-Dimensional Modulation", *IEEE Transactions on Information Theory*, V. 40, No. 6, Nov. 1994, pp. 1773-1791.

Tsatsanis, Michail K., et al. "Estimation and Equalization of Fading Channels with Random Coefficients", *Signal Processing*, vol. 53, 1996, pp. 211-229.

Moon, Sung-Hoon, et al., "Spatial Diversity Technique for Improvement of DTV Reception Performance", *IEEE Transactions on Consumer Electronics*, V. 49, No. 4, Nov. 2003, pp. 958-964.

Speth, Michael, et al., "MLSE Based Detection for GFSK Signals with Aribitrary Modulation Index", *International Zurich Seminar on Communications*, Feb. 2004, pp. 228-231.

Pupolin, Silvano, et al. "Progetto Primo Report", *Instituto Superiore Mario Boella*, Jan. 2002.

Heo, Seo Weon, et al. "A Concatenated Equalizer/Trellis Decoder Architecture for a Terrestrial Digital Television Receiver", *IEEE*, 2004, pp. 813-819.

Santella, Giovanni, "OFDM with Guard Interval and Sub-Channel Equalizationing a 2-Resoluation Transmission Scheme for Digital Television Broadcasting", *IEEE*, 1994, 374-380.

Son, Sang-Won, et al. "Frequency-Domain Equalization for Distributed Terrestrial DTV Transmission Environments", *IEEE*, 2006, pp. 59-67.

Rohling, H., et al. "Differential Amplitude Phase Shift Keying (DAPSK)—A New Modulation Method for DTVB", *International Broadcasting Convention—Conference Publication*, No. 413, 1995, pp. 102-108.

Pietrobon, Steven S., "Trellis-Coded Multidimensional Phase Modulation", *IEEE Transactions on Information Theory.*, V. 36, No. 1, Jan. 1990, pp. 63-89.

Park, Jeongsoon, et al., "Error Propagation in Decision Feedback Equalization for a Terrestrial Digital Television Receiver", *IEEE*, 2003, pp. 927-932.

Ölçer, Sedat, et al. "Difference-Metric Viterbi Decoding of Multilevel Class-IV Partial Response Signals", *IEEE Transactions on Communication*, V. 42, No. 2/3/4, Feb.-Apr. 1994, pp. 1558-1570.

Martone, Massimiliano, "Optimally Regularized Channel Tracking Techniques for Sequence Estimation Based on Cross-Validated Subspace Signal Processing", *IEEE Transactions on Communications*, V. 48, No. 1, Jan. 2000, pp. 95-105.

Baek, Jong-Seob, et al., "Hybrid Fast Kalman and Variable Step-Size LMS Decision Feedback Equilizer for 8-VSB DTV", *IEEE*, 2003, pp. 2362-2366.

Oh, Jisung, et al., "A Single VSB/QAM/QPSK IC for ATSC and Opencable™ Digital Terminals", *IEEE*, 2001, pp. 443-449.

Cherubini, G, et al., "Adaptive Analog Equalization and Receiver Front-End Control for Multilevel Partial-Response Transmission Over Metallic Cables", *IEEE Transactions on Communications*, V. 44, No. 6, Jun. 1996, pp. 675-685.

U.S. Appl. No. 11/121,064, filed May 5, 2005, Hae-Joo Jeong et al., Samsung Electronics Co., Ltd.

U.S. Appl. No. 11/030,878, filed Jan. 10, 2005, Hae-Joo Jeong et al., Samsung Electronics Co., Ltd.

U.S. Appl. No. 11/484,724, filed Jul. 12, 2006, Hae-Joo Jeong et al., Samsung Electronics Co., Ltd.

* cited by examiner

DIGITAL BROADCASTING TRANSMISSION AND/OR RECEPTION SYSTEM TO IMPROVE RECEIVING PERFORMANCE AND SIGNAL PROCESSING METHOD THEREOF

CROSS-REFERENCE TO RELATED APPLICATION

This application is a continuation of U.S. patent application Ser. No. 11/121,064, filed May 4, 2005, which claims benefit from U.S. Provisional Application No. 60/568,275 filed on May 6, 2004 and Korean Patent Application No. 2004-101931, filed on Dec. 6, 2004, the entire contents of which are incorporated herein by reference.

BACKGROUND OF THE INVENTION

1. Field of the Invention

The present general inventive concept relates to a digital broadcasting transmission and/or reception system and a signal processing method thereof, and more particularly, to a digital broadcasting transmission and/or reception system and a signal processing method thereof capable of improving reception performance of a reception system by inserting and transmitting a known sequence into a VSB (Vestigial Side Bands) data stream.

2. Description of the Related Art

Generally, an ATSC (Advanced Television Systems Committee) VSB mode, which is the U.S. terrestrial digital broadcasting system, is a single carrier method, and a field sync is used in a unit of 312 segments.

FIG. I is a block diagram for displaying a transceiver including a digital broadcasting transmitter and a digital broadcasting receiver according to an ATSC DTV standard as a general U.S. terrestrial digital broadcasting system.

Referring to FIG. 1, the digital broadcasting transmitter has a randomizer 110 for randomizing an MPEG-2 transport stream (TS), a Reed-Solomon (hereafter referred to as 'RS') encoder 120 for adding Reed-Solomon parity bytes into the MPEG-2 transport stream to correct a bit error caused by a channel characteristic in a transporting process, an interleaver 130 for interleaving the RS encoded data according to a certain pattern, and a Trellis encoder for performing trellis encoding by a ⅔-rate to the interleaved data and 8-level symbol mapping to perform error correcting coding for the MPEG-2 transport stream.

The digital broadcasting transmitter also includes a MUX 150 for inserting a segment sync and a field sync to the error correction coded data, and a Modulator/RF up-converter 160 for inserting a pilot tone after adding a certain DC value in a data symbol that the segment sync and the field sync are inserted, and for performing VSB modulation and up-converting to and transmitting an RF channel band signal.

Therefore, the digital broadcasting transmitter randomizes the MPEG-2 transport stream, outer-codes the randomized data through the RS encoder 120 which is an outer coder, and distributes the coded data through the interleaver 130. Also, the digital broadcasting transmitter inner-codes the interleaved data through Trellis encoder 140 by a 12 symbol rate, maps the inner coded data by an 8 symbol rate, and then inserts the field sync, the segment sync, and the pilot tone for VSB modulation, and converts to and transmits the RF signal.

Meanwhile, the digital broadcasting receiver includes a tuner/IF 210 for converting a received RF signal to a baseband signal, and a demodulator 220 for synchronizing and demodulating the converted baseband signal, an equalizer 230 for compensating the demodulated signal for channel distortion caused by a multipath, a Trellis decoder 240 for applying error correction and decoding with respect to the equalized signal, a deinterleaver 250 for rearranging the dispersed data by the interleaver 130 of the digital broadcasting transmitter, an RS decoder 260 for correcting errors, a derandomizer 270 for outputting the MPEG-2 transmission stream by derandomizing the corrected data through RS decoder 260.

Hence, an operation sequence of the digital broadcasting receiver of FIG. 1 is a reverse order of the digital broadcasting transmitter, that is, down-converting the RF signal to the baseband signal, demodulating and equalizing the down-converted signal, performing channel decoding, and restoring the original signal.

FIG. 2 shows a VSB data frame interleaved with a segment sync signal and a field sync signal for the U.S. digital broadcasting (8-VSB) system. Each data frame consists of two data fields, and each field contains a 1 field sync segment and a 312 data segment. In the VSB data frame, the segment is equivalent to one MPEG-2 packet, and can have a 4-symbol segment sync and 828 data symbols.

In FIG. 2, the segment sync signal and field sync signal for sync signals are used for synchronization and equalization at the digital broadcasting receiver. That is, the field sync signal and segment sync signal are data between the digital broadcasting transmitter and receiver to be used as reference signals in equalization by the receiver.

The VSB mode of the U.S. terrestrial digital broadcasting system depicted in FIG. I adopts a single carrier method, which has a weakness in multipath fading channel environments with Doppler. Therefore, performance of the digital broadcasting receiver depends on a capacity of the equalizer for eliminating such multipath.

However, the existing transmitting frame of FIG. 2 has a weakness in degrading an equalization performance due to a low frequency in appearance, since the field sync, that is a reference signal of an equalizer, appears once every 313 segments.

That is, it is difficult to estimate channels and to equalize the received signal by eliminating the multipath using an existing equalizer and such small data described above. Due to this, the conventional digital broadcasting receiver has a problem of reception performance deterioration in poor channel environment, particularly in Doppler fading channel environment.

SUMMARY OF THE INVENTION

The present general inventive concept provides a digital broadcasting transmission and/or reception system and a signal-processing method thereof capable of generating and transmitting a transmission signal to which known data is added at a digital broadcasting transmitter and of detecting the transmission signal at a digital broadcasting receiver, so as to improve the reception capacity of the digital broadcasting receiver.

Additional aspects and advantages of the present general inventive concept will be set forth in part in the description which follows and, in part, will be obvious from the description, or may be learned by practice of the general inventive concept.

The foregoing and/or other aspects and advantages of the present inventive concept may be achieved by providing a digital broadcasting transmitter comprising a randomizer to input and randomize data streams including one or more segments with at least one segment having one or more null packets, a null packet exchanger to create known data having a predetermined pattern and to replace the null packets at positions of the one or more segments having the null packets of the randomized data streams to insert the known data, an encoder to encode the data streams to which the known data is inserted, and a modulation IRF unit to modulate, RF-convert, and transmit the encoded data streams.

The data streams may include information about the position at which the known data is inserted.

The encoder may include a first RS (Reed Solomon) encoder to add a parity of predetermined bytes to the data streams in which the known data is inserted in order to correct errors occurring by channels, an interleaver to apply data interleaving in a predetermined pattern with respect to the data streams to which the parity is added, and a Trellis encoder to perform a Trellis encoding of the interleaved data stream.

The Trellis encoder may comprise a memory element for the Trellis-encoding operation, initializes the memory element at the position where the known data is inserted, and applies the Trellis encoding to the known data.

The digital broadcasting transmitter may further comprise a packet buffer to input and temporarily store the data streams corresponding to the position where the memory element of the Trellis-encoder is initialized from the first RS encoder.

The packet buffer may receive from the Trellis encoder the data streams changed according to the initialization of the memory element and may update the stored data streams.

The digital broadcasting transmitter may further comprise a second RS encoder to apply the RS encoding to the encoded known data input from the packet buffer to create and output a changed parity to the Trellis encoder, to replace the parity added by the first RS encoder, and to apply the Trellis encoding to the replaced parity.

The modulation IRF unit modulates the encoded data in a Vestigial Side Bands (VSB) modulation method.

The foregoing and/or other aspects and advantages of the present general inventive concept may also be achieved by providing a signal-processing method of a digital broadcasting transmission system, the method comprising inputting and randomizing data streams including one or more segments having at least one segment having one or more null packets, creating known data having a predetermined pattern and replacing the null packets at positions of the segments having the null packets of the randomized data streams to insert the known data, encoding the data streams to which the known data is inserted, and modulating, RF-converting, and transmitting the encoded data streams.

The encoding operation may include adding a parity of predetermined bytes to the data streams in which the known data is inserted in order to correct errors occurring by channels, applying data interleaving in a predetermined pattern to the data streams to which the parity is added, and performing a Trellis encoding of the interleaved data stream.

The Trellis encoding operation may comprise initializing a memory element and performing the Trellis-encoding operation at the position at which the known data is inserted.

The signal-processing method may further comprise inputting and temporarily storing the data streams corresponding to the position where the memory element for the Trellis-encoding operation is initialized from the first RS encoding operation, and inputting and updating the stored data streams as the data streams changed according to the initialization of the memory element in the Trellis encoding operation.

The signal-processing method may further comprise a second RS encoding operation of applying the RS encoding to the known data encoded according to the initialization of the memory element and creating a changed parity, wherein the Trellis-encoding operation is repeated to replace the parity added in the first RS encoding operation with the changed parity, add and apply the Trellis encoding to the changed parity.

The modulation/RF operation may comprise modulating the encoded data in a Vestigial Side Bands (VSB) method.

The foregoing and/or other aspects and advantages of the present general inventive concept may also be achieved by providing a digital broadcasting receiver comprising a tuner to receive a signal from a digital broadcast transmitter and to convert the received signal to a baseband signal, the signal that is encoded by inserting known data with respect to a data stream to which null packets are inserted at a specified position at intervals, a demodulator to demodulate the baseband signal, a known data detector to detect the known data from the demodulated signal, and an equalizer to equalize the signal demodulated using the detected known data.

The known data may have a predetermined pattern.

The known data detector may detect and output to the equalizer the known data using information of the positions at which the known data included in the received signal is inserted.

The known data detector may comprise outputting the detected known data to the demodulator, and the demodulator may perform demodulating using the known data.

In the meantime, The foregoing and/or other aspects and advantages of the present general inventive concept may also be achieved by providing a signal-processing method of a digital broadcasting reception system, the signal-processing method comprising receiving a signal from a digital broadcast transmitter and converting the received signal to a baseband signal, the signal that is encoded by inserting known data with respect to a data stream to which null packets are inserted at a specified position at intervals, demodulating the baseband signal, detecting the known data from the demodulated signal, and equalizing the signal demodulated using the detected known data.

The known data may have a predetermined pattern.

The known data-detecting operation may comprise detecting the known data using information of the positions at which the known data included in the received signal is inserted.

The known data-detecting operation may further comprise outputting the detected known data to the demodulation operation, and the demodulation operation comprises performing demodulation using the known data.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
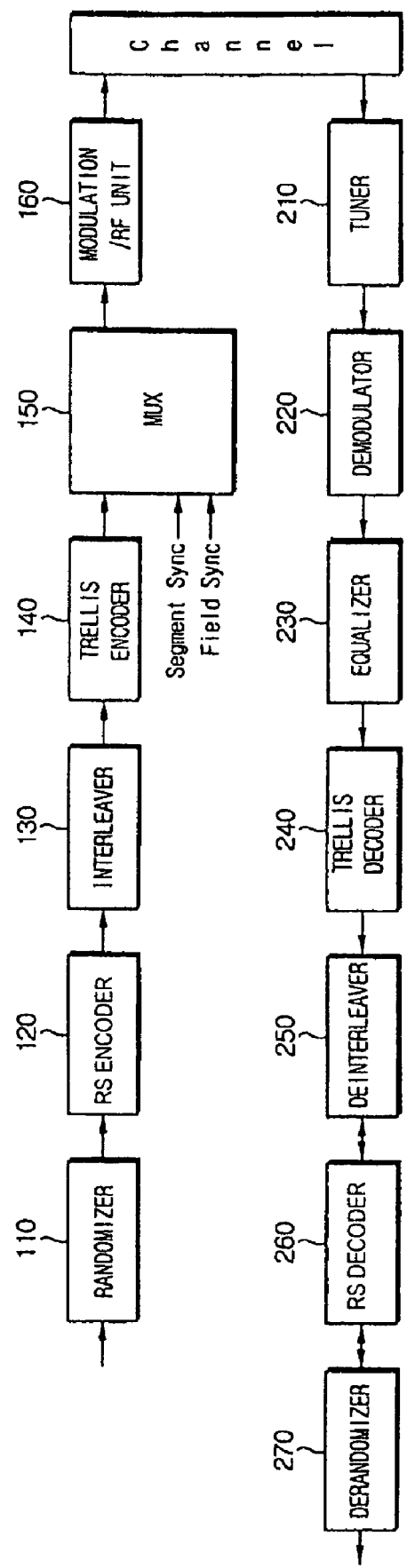
FIG. 1 is a block diagram showing a transmission/reception system for a general US digital broadcasting system.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
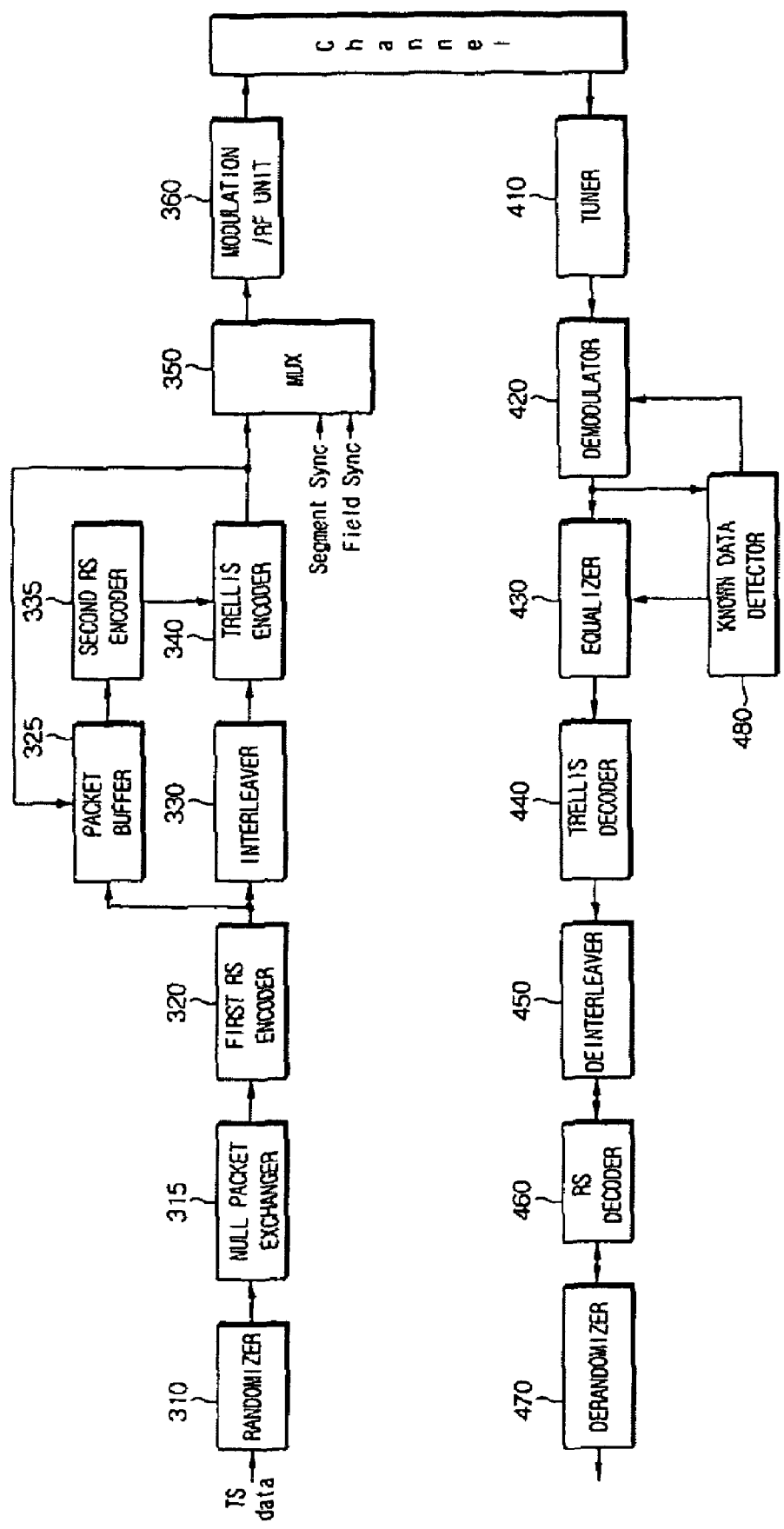
FIG. 3 is a block diagram showing a digital broadcasting transmission and/or reception system according to an embodiment of the present general inventive concept.

FIG. 3 is a block diagram showing a digital broadcasting transmission and/or reception system according to an embodiment of the present general inventive concept. The digital broadcasting transmission and/or reception system may have a digital broadcasting transmitter and a digital broadcasting receiver.

Referring to FIG. 3, the digital broadcasting transmitter includes a randomizer 310, a null packet exchanger 315, a first RS encoder 320, a packet buffer 325, an interleaver 330, a second RS encoder 335, a Trellis encoder 340, a multiplexer 350, and a modulation and RF unit 360.

The randomizer 310 randomizes inputted MPEG-2 transmission stream data in order to improve the usage of an allocated channel space.

The stream data input to the randomizer 310 has a null packet of a segment unit that does not include ordinary data within a segment in a predetermined interval, which will be described in detail later.

The null packet exchanger 315 creates a specific sequence (hereinafter, referred to as 'known data') having a predetermined pattern defined beforehand between a transmitter and a receiver, so that the null packet is replaced with the known data in the segment corresponding to the null packet among randomized data streams.

The known data is used for synchronization and equalization at the receiver since its pattern is distinguished from general transmission and reception payloads so that the known data can be easily detected from payload data.

The first RS encoder 320 replaces the null packet with the known data by the null packet exchanger 315 in order to correct errors caused by channels, and applies the RS encoding to an outputted data stream, and adds a parity of predetermined bytes.

The interleaver 330 performs data interleaving in a prescribed pattern with respect to the parity-added packet output from the first RS encoder 320.

The Trellis encoder 340 converts to a symbol the data outputted from Interleaver 330, and performs 8-level symbol mapping through the Trellis encoding of a ⅔ ratio. The Trellis encoder 340 initializes a value temporarily stored in its memory device in a beginning point of the known data, to a specific value, and performs the Trellis encoding to the known data. For example, the value stored in the memory device is initialized to a u00 state.

The packet buffer 325 inputs and temporarily stores the known data from data stream outputted in the first RS encoder 320, inputs the known data changed according to initialization if the known data is changed according to the initialization of the memory device of the Trellis encoder 340, and temporarily stores the changed known data replacing the temporarily stored known data before the change, and inputs the changed known data to the second RS encoder 335 for parity re-creation.

The second RS encoder 335 receives the known data changed according to the initialization, and re-creates and inputs the parity according to the changed known data into the Trellis encoder 340 so as to replace the original parity with a newly created parity, and applies the Trellis encoding to the changed (recreated or input) parity.

Therefore, the packet data output from the Trellis encoder 340 to the MUX 350 has the known data changed according to the initialization of the memory device of the Trellis encoder 340 and the parity-added data format according to the initialization and the RS encoding.

Figure 2:
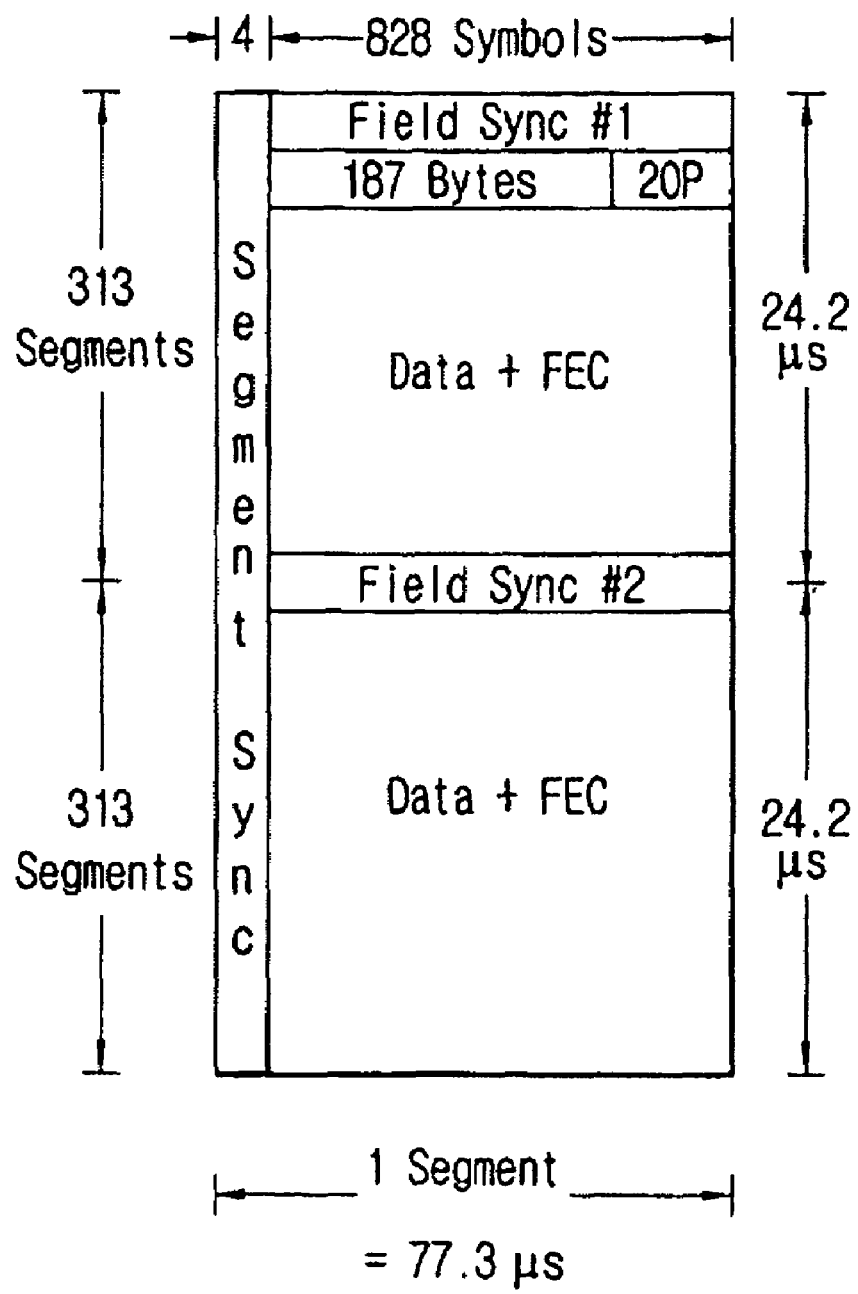
FIG. 2 is a view showing an ATSC VSB data frame structure.

The MUX 350 inserts a segment sync signal by a segment unit, as shown in the data format of FIG. 2, to data converted to a symbol by the Trellis encoder 340, inserts a field sync signal by a field unit, and inserts a pilot signal on an edge part of a low frequency band on a frequency spectrum by adding a predetermined DC value to a data signal of a predetermined level.

The modulation IRF unit 360 pulse-shapes and performs VSB modulation with respect to the data signal into which the pilot signal is inserted, wherein the VSB modulation amplitude-converts the data signal by putting the signal on an intermediate frequency (IF) carrier and the like, and RF-converts, amplifies, and sends the modulated signal in a predetermined band through an allocated channel.

In the meantime, the digital broadcasting receiver of FIG. 3 includes a tuner 410, demodulator 420, equalizer 430, a Trellis decoder 440, a de-interleaver 450, an RS decoder (460), a derandomizer 470 and a known data detector 480, and decodes a received signal by performing reverse operations of the digital broadcasting transmitter of FIG. 3.

The tuner 410 tunes the received signal and converts the tuned signal of a tuned band to a baseband signal.

The demodulator 420 detects a sync signal according to the pilot signal and the sync signal inserted in a signal of the baseband signal and performs demodulation.

Further, the equalizer 430 removes interference between received symbols by compensating for channel distortion caused by a multipath of channels from a decoded signal. That is, the signal of the baseband signal may be at least one of signals transmitted to the digital broadcasting receiver from the digital broadcasting transmitter through at least one of a plurality of paths, and the multipath of the channels may comprise a first channel and a second channel corresponding to the plurality of paths. The respective symbols of the signals are different from each other due to the different paths or channels through which the signals are transmitted. Therefore, the equalizer 430 can remove the interference occurring between the received symbols of the first and second channels or the plurality of paths, according to the detected known data.

The Trellis decoder 440 performs error correction, decodes the error-corrected symbols, and outputs symbol data.

The decoded data re-sorts distributed data by the interleaver 330 of the digital broadcasting transmitter through the deinterleaver 450.

The RS decoder 460 corrects errors of the deinterleaved data, and the data corrected through the RS decoder 460 is derandomized through the derandomizer 470 so that the data of MPEG-2 transmission stream is restored.

In the meantime, the known data detector 480 detects the known data from the decoded data, and provides the known data for sync detection of the demodulator 420 and channel distortion compensation of the equalizer 430.

Figure 4:
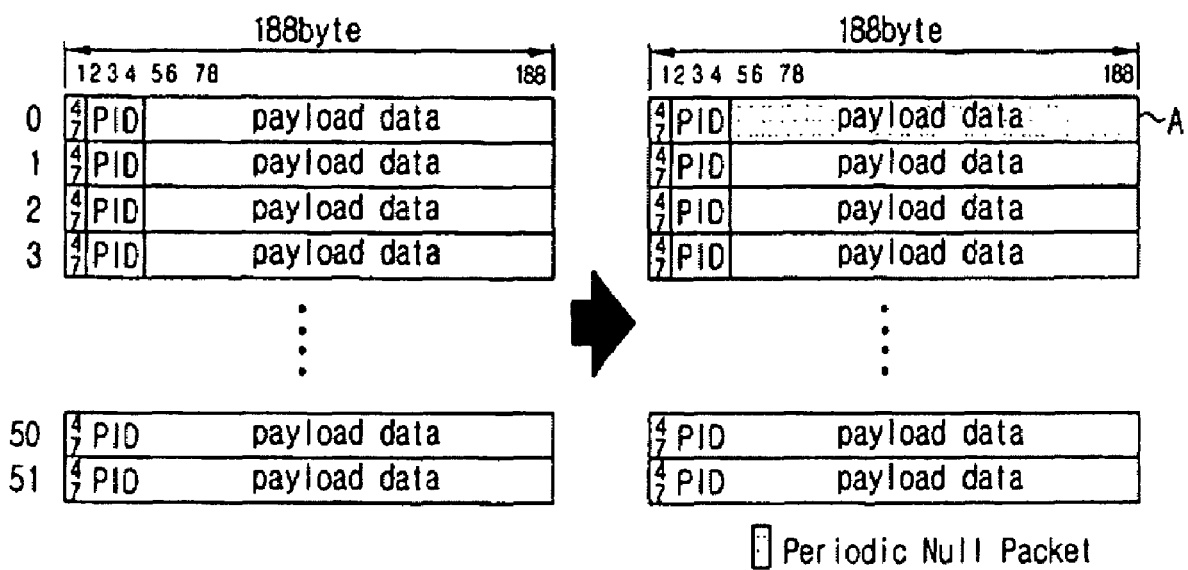
FIG. 4 is a view showing a format of MPEG-2 packet data according to an embodiment of the present general inventive concept.

FIG. 4 is a view showing an MPEG-2 packet data format according to an embodiment of the present general inventive concept.

Referring to FIG. 4, a data frame of a general MPEG-2 data stream has a plurality of segments each having a head part, such as a 3-byte header having a first byte as a sync signal and a PID (Packet Identity), and general payload data A intended to be transmitted. The general payload data of the segment may include a video signal and an audio signal.

According to the embodiment of the present general inventive concept, at least one of the plurality of segments has a null packet, which does not include the general payload data, in a predetermined interval except for the header part. The null packet is disposed between a first number of segments and a second number of segments, and the first number may be the same as the second number. In this case, the null packet is periodically formed in the data stream.

That is, the segment having the null packet does not include separate information intended to be transmitted except for the header part including information about a null packet position.

On the other hand, the embodiment of the present general inventive concept inserts one null packet segment in every predetermined interval for the convenience of explanation, but the frequency and number of null packet segments can be adjusted according to a data transmission rate, channel environment, and so on.

Figure 5:
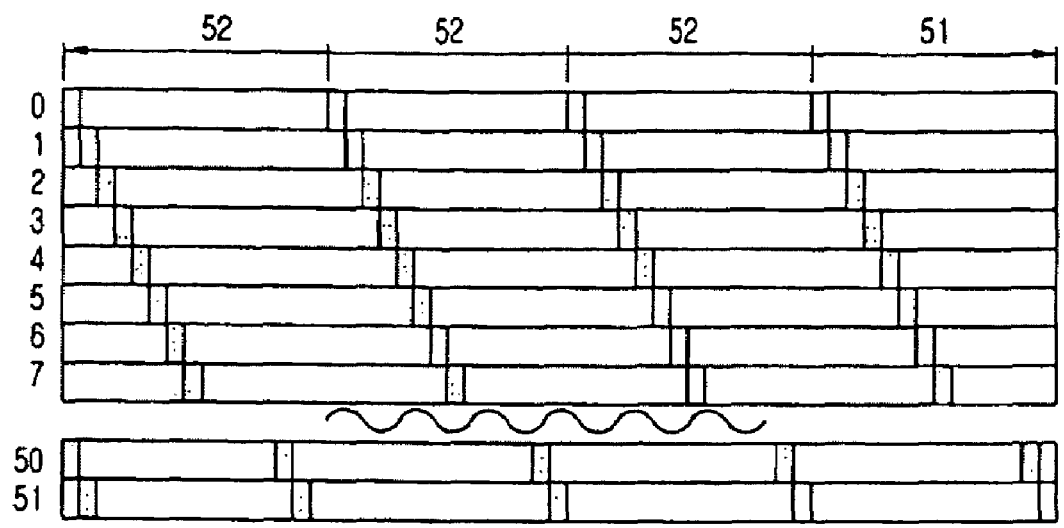
FIG. 5 is a view showing a format of data to which data interleaving is applied.

FIG. 5 is a view showing a data format of a data frame to which data interleaving is applied.

Referring to FIGS. 3 through 5, the interleaver 330 disturbs the order of the data stream to distribute data in a time axis so that a transmission signal becomes strong in interference.

Such a data distribution method of the interleaver 330 shows that the null data contained in the same segment regularly and in order appears once every 52 bytes in a width that is equal crosswise to appear sequentially and regularly once every 52 byte.

Figure 6:
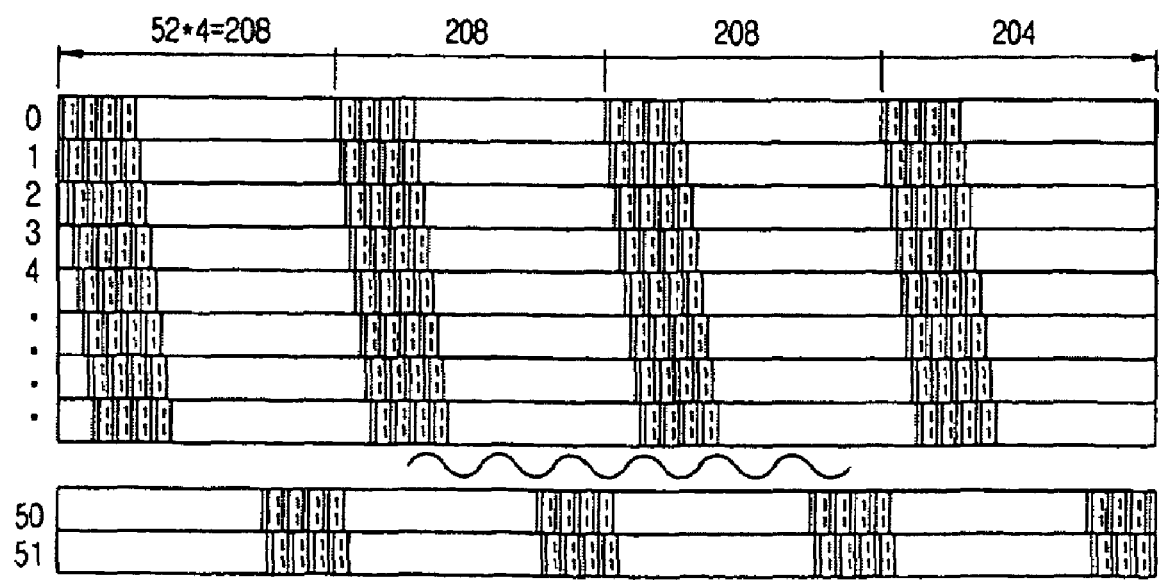
FIG. 6 is a view showing a format of data to which Trellis encoding is applied.

FIG. 6 is a view showing a format of data to which the Trellis encoding is applied.

Referring to FIGS. 3-6, the Trellis encoder 340 encodes one byte of data outputted from the interleaver 330 into four 8-level symbols.

Each known data byte appearing every 52 bytes is encoded to 4 symbols.

Hereinafter, a symbol created from the Trellis encoding with respect to the known data byte is referred, to as a known symbol.

Therefore, 4 known symbols appears every 208 symbols if the Trellis encoding is performed That is, the known symbol is regularly inserted in a general data stream in a predetermined interval, so that the known symbol can be easily detected from the general data stream.

Figure 7:
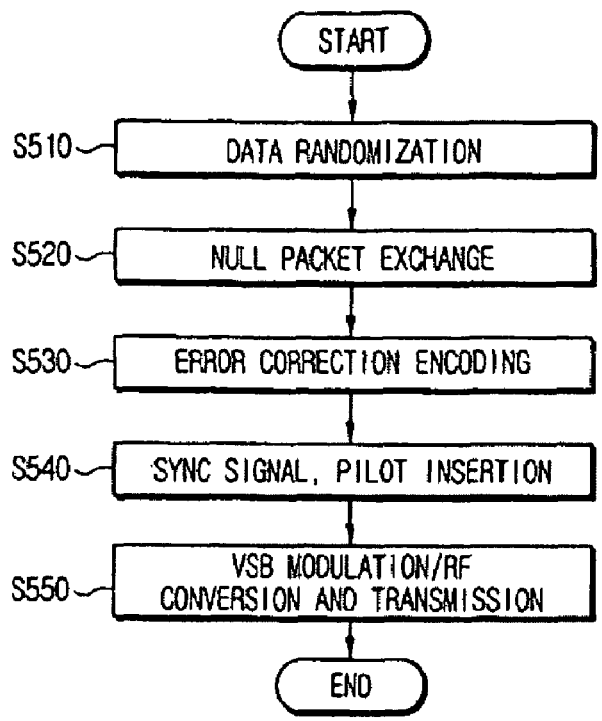
FIG. 7 is a flowchart showing operations of a digital broadcasting transmitter according to an embodiment of the present general inventive concept.
Figure 8:
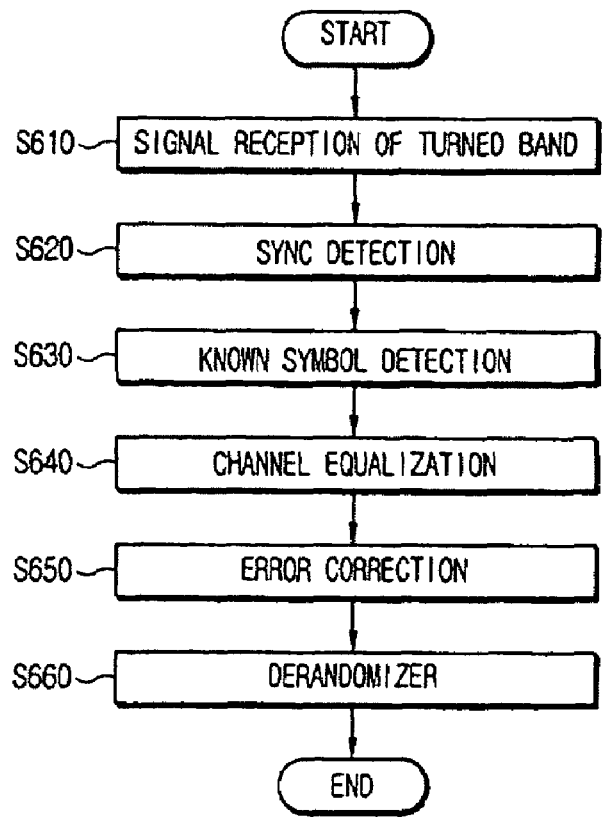
FIG. 8 is a flowchart showing operations of a digital broadcasting receiver according to an embodiment of the present general inventive concept.

FIG. 7 is a flowchart showing operations of a digital broadcasting transmitter according to an embodiment of the present general inventive concept.

Referring to FIGS. 3-7, the randomizer 310 receives and randomizes the MPEG-2 transmission stream including the plurality of segments including the at least one segment having a null packet that does not include ordinary data (S510).

The data inputted to the randomizer 310 has the data format as shown in FIG. 4.

In FIG. 4, of the MPEG-2 packets according to the present invention, the at least one segment having the null packet includes the header part having a first byte as the sync signal and a 3-byte PID (Packet Identity), and does not include the general payload data.

Further, the null packet exchanger 315 creates a packet having the known data, and inserts the packet having the known data at the position of the null packet included in the data randomized in the randomizer 310 (S520).

The known data has a predetermined pattern as the data known between a transmitter and a receiver so that the known data can be distinguished from the general data and easily detected.

Further, the error correction encoding is applied to a transmission stream into which the known data output from the null packet exchanger 315 is inserted, so that the errors occurring by a channel are corrected (S530).

For the error correction encoding, the first RS encoder 320 adds a parity of predetermined bytes by performing the RS encoding, and interleaver 330 performs the data interleaving in a predetermined pattern, the Trellis encoder 340 converts the interleaved data to a symbol and performs a 8-level symbol mapping through the Trellis encoding of a ⅔ ratio.

In the meantime, the packet buffer 325 inputs and temporarily stores data output from the first RS encoder 320, and, if the known data is trellis-encoded in the Trellis encoder 340 according to initialization, the packet butter 325 inputs from the Trellis encoder 340 the known data changed as initialized, updates the known data temporarily stored before change, and temporarily stores the changed known data.

The changed known data input to the packet buffer 325 is input to the second RS encoder 335 for parity recreation The second RS encoder 335 applies the RS encoding to the changed known data to create a changed parity, and sends the created parity to the Trellis encoder 340.

Accordingly, the Trellis encoder 340 replaces a previous parity with the changed parity input from the second RS encoder 335, applies the Trellis encoding to the changed parity, and outputs the Trellis-encoded parity according to the output symbol data already Trellis-encoded.

Therefore, the packet data outputted to the MUX 350 in the Trellis encoder 340 is the data Trellis-encoded to the 8-level symbol with respect to the known data changed according to the initialization of the memory device of the Trellis encoder 340 and the packet data parity-added by the RS encoding.

Further, a segment sync signal is inserted to each segment of the symbol data, a field sync signal is inserted to each field, and a pilot signal is inserted on a frequency spectrum (S540).

Further, the modulation/RF unit 360 performs the VSB modulation such as the pulse shaping of a signal into which a pilot signal is inserted, the amplitude modulation of an Intermediate Frequency carrier, and so on, RF-converts and amplifies the modulated signal, and transmits the amplified signal through an allocated channel (S550).

As stated above, the digital broadcasting transmitter creates and inserts null packets into the MPEG-2 transmission stream, replaces the inserted null packets with the known data, and sends the known data, and the digital broadcasting receiver detects and uses the known data so as to improve its reception performance such as the sync acquisition and equalization performance.

According to the embodiment of the present general inventive concept, the digital broadcasting transmitter creates and inserts the null packets into an MPEG-2 transmission stream packet, replaces the inserted null packets with the known data and sends the known data, and the digital broadcasting receiver detects the known data from a received signal from the digital broadcasting transmitter and uses the known data for the synchronization and equalization so that its digital broadcasting reception performance can be improved on poor multipath channel.

Further, the present general inventive concept can improve an operational performance of an equalizer and improve digital broadcasting reception performance by properly controlling the frequency and quantity of the known data for sync and equalization of a receiver Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital broadcast receiver configured to receive a signal from a digital transmitter, wherein the digital transmitter comprises a known data exchanger inserting known data at a certain position in data, an interleaver interleaving the data including the known data, a trellis encoder trellis encoding the interleaved data to an 8-level symbol at a rate of ⅔, and initializing a memory of the trellis encoder to a predetermined value in a predetermined position of the interleaved known data, and a modulator performing a VSB modulation of the trellis encoded data, the digital broadcast receiver comprising:
 a demodulator performing a VSB demodulation of the received, modulated signal, the signal having the trellis encoded symbol corresponding to the known data, the known data being processed by the initialized trellis encoder of the transmitter; and
 an equalizer removing an interference of the demodulated signal according to the trellis encoded symbol corresponding to the known data,
 wherein the known data is a predefined sequence known between the digital transmitter and the digital broadcast receiver.

2. A digital broadcast receiver configured to receive a signal from a digital transmitter, wherein the digital transmitter comprises a known data exchanger inserting known data at a certain position in data, the known data being a predefined sequence known between the digital transmitter and the digital broadcast receiver, an interleaver interleaving the data including the known data, a trellis encoder trellis encoding the interleaved data to an 8-level symbol at a rate of ⅔, and initializing a memory of the trellis encoder to a predetermined value in a predetermined position of the interleaved known data, and a modulator performing a VSB modulation of the trellis encoded data, the digital broadcast receiver comprising:
 a tuner configured to receive the signal transmitted by the digital transmitter, the signal having the trellis encoded symbol corresponding to the known data, the known data being processed by the initialized trellis encoder of the transmitter;
 a demodulator performing a VSB demodulation of the received signal, which was modulated by the modulator of the transmitter; and
 an equalizer removing an interference of the demodulated signal according to the trellis encoded symbol corresponding to the known data by compensating for a channel distortion of the demodulated signal due to a multipath of a channel.

3. The digital broadcast receiver as claimed in claim 2, further comprising a trellis decoder performing an error correction of the trellis encoded symbol and decoding the error-corrected trellis encoded symbol.

4. The digital broadcast receiver as claimed in claim 2, further comprising a deinterleaver rearranging the received signal.

5. The digital broadcast receiver as claimed in claim 4, further comprising a decoder performing an error correction of the deinterleaved signal.

6. The digital broadcast receiver as claimed in claim 5, further comprising a derandomizer derandomizing the error corrected signal.

7. The digital broadcast receiver as claimed in claim 2, further comprising a known data detector to detect the trellis encoded symbol corresponding to the known data from the received signal.

8. The digital broadcast receiver as claimed in claim 7, wherein the known data detector uses information on a position at which the known data included in the received signal is inserted to detect the known data.

9. The digital broadcast receiver as claimed in claim 7, wherein the known data detector outputs the known data to the equalizer.

10. The digital broadcast receiver as claimed in claim 7, wherein the known data detector outputs the known data to the demodulator, and the demodulator performs the VSB demodulation using the known data.

11. The digital broadcast receiver as claimed in claim 2, wherein the received signal includes a segment sync signal and a field sync signal, different from the known data.

12. A signal processing method for a digital broadcast receiver receiving a signal from a digital transmitter that inserts known data at a certain position in data, the known data being a predefined sequence known between the digital transmitter and the digital broadcast receiver, interleaves the data including the known data, and initializes a memory of a trellis encoder to a predetermined value in a predetermined position of the interleaved known data to trellis encode the interleaved data to an 8-level symbol at a rate of ⅔, the signal processing method comprising:
 receiving the signal transmitted by the digital transmitter, the signal having the trellis encoded symbol corresponding to the known data, the known data being processed by the initialized trellis encoder of the transmitter;
 performing a VSB demodulation of the received signal, which was modulated by the modulator of the transmitter; and
 removing an interference of the demodulated signal according to the trellis encoded symbol corresponding to the known data by compensating for a channel distortion of the demodulated signal due to a multi-path of a channel.

13. The signal processing method as claimed in claim 12, further comprising performing an error correction of the trellis encoded symbol and decoding the error-corrected trellis encoded symbol.

14. The signal processing method as claimed in claim 12, further comprising deinterleaving the received signal.

15. The signal processing method as claimed in claim 14, further comprising performing an error correction of the deinterleaved signal.

16. The signal processing method as claimed in claim 15, further comprising derandomizing the error corrected signal.

17. The signal processing method as claimed in claim 12, further comprising detecting the trellis encoded symbol corresponding to the known data from the received signal.

18. The signal processing method as claimed in claim 17, wherein the performing of the VSB demodulation comprises performing the VSB demodulation using the detected known data.

19. The signal processing method as claimed in claim 17, wherein the removing of the interference of the demodulated signal comprises removing the interference using the detected known data.

20. The signal processing method as claimed in claim 12, wherein the received signal includes a segment sync signal and a field sync signal, different from the known data.

* * * * *